Jan. 30, 1962     P. J. HANNAN ET AL     3,018,558
DEVICE FOR DETECTING SMALL CHANGES IN LEVEL
Filed April 29, 1960
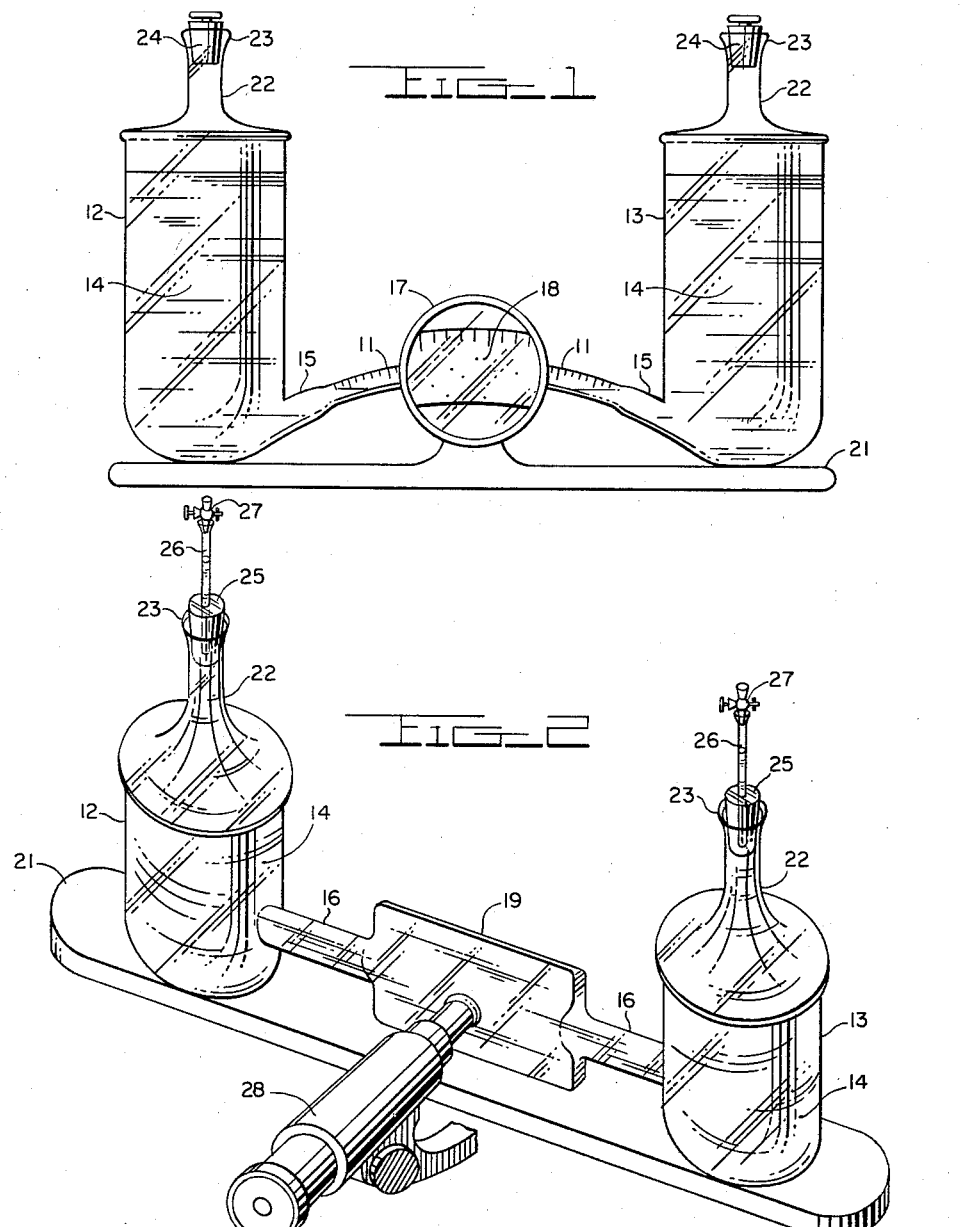
INVENTORS
PATRICK J. HANNAN
JOHN M. LEONARD
BY *Richard O. Reed*
ATTORNEY

# United States Patent Office 3,018,558
Patented Jan. 30, 1962

3,018,558
DEVICE FOR DETECTING SMALL CHANGES IN LEVEL
Patrick J. Hannan, 3632 Veazy St. NW., Washington, D.C., and John M. Leonard, 3718 Williams Lane, Chevy Chase, Md.
Filed Apr. 29, 1960, Ser. No. 25,804
7 Claims. (Cl. 33—209)
(Granted under Title 35, U.S. Code (1952), sec. 266)

The invention described herein may be manufactured and used by or for the Government of the United States of America for governmental purposes without the payment of any royalties thereon or therefor.

The present invention relates to an improvement in liquid levels and more particularly to a device for detecting small changes in level.

Conventional liquid levels depend on an air bubble which is viewed in its resting position between zero markings or at some angular deviation from horizontal where the angle of tilt is read from a calibrated scale. The sensitivity of liquid levels is related to a visibly discernible displacement of the air bubble for any slight or small change in the angle of tilt. When an air bubble has settled at a certain position in the level, its subsequent movement may be affected by such things as the surface tension of the liquid, by a temperature change, or by some slight imperfection in the construction of the tube. Air bubbles are also critically affected by the volume of liquid which may be altered by evaporation, absorption or by temperature change. Obviously, extremely small angular tilts below the sensitivity level of an air bubble device go undetected, while those which are just barely discernible are subject to the bubble limitations noted above.

It is therefore an object of the present invention to provide a novel device for detecting minute changes in level.

Another object of this invention resides in a leveling device which does not depend on an air bubble alone to indicate small deviations in the horizontal and therefore overcomes many of the disadvantages of the prior art.

A further object of the invention is to provide a novel type leveling device which has increased sensitivity in detecting slight changes in level.

A still further object of the invention resides in the provision of a novel device which can be employed for positioning precision instruments requiring sensitive horizontal deviation detection.

Other objects and advantages will be apparent upon a careful consideration of the following description with reference to the accompanying drawings wherein:

FIG. 1 is a front view of a level device embodying the present invention;

FIG. 2 is a perspective view of another embodiment of the invention showing a flat transverse section upon which a miscroscope is easily focused.

Briefly described, the novel device of the present invention comprises a pair of balanced liquid volumes communicating with one another through a transversely disposed conduit member, which may be a narrow-bore tube, through which the liquid flowing from one liquid volume to the other is detected by means of minute, discrete particles suspended in the liquid medium. An image magnifier is focused on the tube for observing the movement of particles when the liquid medium is set in motion. As the level device is tilted from its initial position, the liquid in the balanced liquid volumes seeks a new level, commensurate with the angle of displacement, and the liquid in passing through the narrow-bore tube increases in velocity, and movement of the accelerated particles is more easily followed. The particle movement enables the observer to detect any slight or small shift in angular displacement which is not readily discernible by conventional liquid levels. The device may be calibrated to indicate the degree of angular displacement by measuring the linear movement of a particle in a given time interval.

Referring now to the drawings in which like reference numerals denote like parts, the invention illustrated by way of example in FIG. 1 comprises a transparent capillary tube 11 having a bore, for example, 1 mm. in diameter and being connected at its ends with liquid containers or reservoirs 12 and 13 of any convenient cross-section area and height. The capillary tube is shown with a convex curvature which is a preferred structure, although the tube may assume any other desired shape. The reservoirs communicate with each other through the capillary tube and thus form a continuous vessel for liquid medium 14, which may be water or any other equivalent liquid. The liquid completely fills the capillary tube and is also contained in reservoirs 12 and 13 to any desired height, thus forming above the level of the capillary tube a liquid head of two balanced liquid volumes. The liquid in reservoirs 12 and 13 is considerably above connecting arms 15 which join the capillary tube with the reservoirs, and said liquid head exerts in the tube a substantial hydrostatic pressure; furthermore, since the capillary bore is considerably smaller than the bore in the side arms, the liquid entering the capillary tube will have an increased velocity. Liquid flow in the capillary tube is detected by means of mica (biotite) of uniform particle size forming a permanent suspension in the liquid medium. The particles in suspension are observed by means of a fixed focus magnifier 17; the enlarged field of vision, shown at 18, reveals particles of a relatively uniform diameter size, for example, 4 to 9 microns in diameter, moving across the field of vision at speeds commensurate with the angle of tilt and relative to the difference in the liquid heads in reservoirs 12 and 13.

As illustrated in FIG. 1, closure means, such as lids 22, are provided for the reservoirs to prevent evaporation and contamination of the enclosed liquid. An opening 23 in each lid provides a means for relieving localized pressures in the reservoirs which have been found to be a source of interference in the particle movement. Stoppers 24 are fitted in the openings to provide capping means when the device is not in use.

In another embodiment of the present invention, as shown in FIG. 2, a flat transverse section 19 replaces the capillary tube of FIG. 1. The flat transverse section is preferably an electrophoresis cell structure without electrodes in which lateral arms 16 connect the cell to the reservoirs. The cell has thin parallel surfaces uniformly spaced about 0.5 mm. apart and with the edges of said surfaces sealed to provide a uniform, narrow passage through which a relatively small amount of liquid can pass through from one reservoir to the other. The electrophoresis cell provides a more accurate stage for observing microscopic particles. As a result of the fine passage between flat, planar surfaces in the transverse structure in FIG. 2, particles as fine as 2-3 microns may be suspended in a liquid of suitable density and the movement of the particles are observed through a microscope of about 200× magnification positioned in front of the flat portion of the transverse structure.

In order to limit air disturbances to a minimum, the reservoirs shown in FIG. 2 are provided with lids 22 in which the openings 23 in said lids are adapted to receive stoppers 25 that are fitted with capillaries 26 for venting purposes; the minimum surface exposed to air currents reduces the random motion of the particles and improves the sensitivity of the device. Stopcocks 27 in the capillaries provide for a release of pressures, and for very precise determinations the stopcocks are closed after venting; the device becomes highly sensitive when the liquid is completely sealed from the air. Care should be observed, moreover, in providing for adequate stopcock lubrication, for absence of lubricant has been found to be a source of interference from the air movements around the stopcock.

It is of course understood that the drawings are for purposes of illustration and are not intended as a definition of the limits of the invention, reference for the latter purpose being directed to the appended claims.

Suitable dispersions for use in the present device may include any liquid having a density that will support particles of a suitable size in a permanent suspension. The particle should be visibly discrete; that is to say, it should be a particle which in suspension remains intact and separated from each other and which can be observed and followed by the naked eye or by some means of image magnification. Water forms useful particle suspensions with many materials, for instance, aqueous suspensions are formed with latex, ragweed pollen, talc and mica in a particle size as large as 60 microns in diameter. In fact any solid particle which does not dissolve or become self-adherant in the dispersing liquid may be effectively used as the particle indicator of the present device. It is important that the particle density be selected to correspond very nearly to the density of the liquid medium in order to obtain suspensions that will not settle out.

Suitable liquid-particle combinations may include aqueous dispersions containing particles of latex or methacrylate of about 40 to 60 microns in diameter. Particles of this size ordinarily will precipitate unless a soluble salt, such as sodium chloride or sodium bromide, is dissolved in the water to raise the density of the solution sufficiently whereby the particles will remain in a stable suspension. An example of a useful aqueous suspension involves the use of a relatively small amount of mica (biotite) particles having a specific gravity of about 2.9 in the narrow ranges of about 2-9 and 14-20 micron diameters. Mica (biotite) forms a stable dispersion with water if it is initially treated with a water repellant; the particles thereof become surface-sealed to prevent them from swelling and absorbing water. The treatment involves exposing the mica powder to a silane vapor in order to seal and form a hydrophobic surface thereon. The powder is gently shaken over a column approximately one foot high containing silane vapor therein and the powder is allowed to descend slowly thereby receiving the necessary surface treatment. Mica particles ranging from 2-9 microns in diameter and treated with silane vapor as described above may also be suspended in tetraboromethane ($CBr_4$) to form a suitable organic type dispersion.

The particles in suspension need only to be present in an amount sufficient to be observable in the field of vision, but their number should be kept within the limit where an observer following a particular particle will not confuse it with neighboring particles encroaching on the field. To improve the visibility, particles may be dyed to obtain sharp contrast in the liquid.

In order to detect minute changes in level or angular displacement that fall below the threshold of observation in bubble levels, the device is positioned, or preferably mounted, on the object or surface which is to be tested. The closures on the reservoirs are then opened prior to use to relieve the internal pressures, and the suspended particles are then observed through a magnifying lens or microscope depending upon the size of the suspended particles. As the object or surface upon which the device rests undergoes slight changes in level, the device will tilt from one angular position to another; the liquid in the reservoirs will flow from one to the other depending upon the angle of tilt. Liquid flow causes the particles therein to move in the direction of flow, thus any slight flow which cannot be observed may readily be detected by movement of the particles. A suspended particle under observation will move in the liquid medium a distance for a given time interval commensurate with the angle of tilt.

A slight angular displacement may be calibrated on the basis of distance that a particular particle will travel in a given time interval. Of course, when the change in level is relatively large, the particles will stream across the field of vision. It will be apparent that the device in addition to providing a sensitive level useful for precision instruments and mountings may also find utility as a vibration indicator.

The device has a sensitivity of about $2.6 \times 10^{-4}$ degree which is 4 or 5 times more sensitive than the sensitivity of master levels currently in use.

Various changes may be made in the design and arrangement without departing from the spirit and scope of the invention as the same will be understood by those skilled in the art.

What is claimed is:

1. A device for detecting small changes in level comprising a transversely disposed hollow member, a pair of liquid reservoirs, said member connected between said reservoirs substantially below the top thereof, a liquid medium contained in said reservoirs and said member, and visibly discrete particles suspended in said liquid medium.

2. A device for detecting small changes in level comprising a transversely disposed tube of relatively small bore, a pair of liquid reservoirs, said tube connected between said reservoirs substantially below the top thereof, a liquid medium contained in said reservoirs and said tube, and visibly discrete particles suspended in said liquid medium.

3. A device for detecting small changes in level comprising a transversely disposed member having flat parallel surfaces, said surfaces having a relatively narrow passage therebetween, a pair of liquid reservoirs, a pair of lateral arms connected to said reservoirs substantially below the top thereof, the opposite ends of said lateral arms connected to and forming a continuous passage with said member, a liquid medium contained in said reservoirs and said member, and visibly discrete particles suspended in said liquid medium.

4. A device for detecting small changes in level comprising a transversely disposed tube of relatively small bore, a pair of vertically disposed liquid reservoirs of relatively large cross-section area at opposite ends of said tube, said tube connected to said containers substantially below the top thereof, a liquid medium contained in said reservoirs and said tube, microscopic particles suspended in said liquid medium and an image magnifier for observing the movement of said particles in said tube.

5. A device for detecting small changes in level comprising a transversely disposed member having flat, parallel surfaces, a relatively narrow spacing between said surfaces and a lateral wall for confining said spacing, a pair of liquid reservoirs, conduit sections disposed between and interconnecting said member with said reservoirs, a liquid medium contained in said reservoirs and said member, and microscopic particles suspended in said liquid medium.

6. A device for detecting small changes in level comprising a transversely disposed hollow member, a pair of liquid reservoirs, said member connected between said reservoirs substantially below the top thereof, water contained in said reservoirs and said member and mica particles suspended in the water.

7. A device in accordance with claim 1 in which biotite particles of relatively uniform size are suspended in an organic liquid medium.

References Cited in the file of this patent

UNITED STATES PATENTS

| | | |
|---|---|---|
| 1,186,334 | Robinson | June 6, 1916 |
| 1,676,984 | Fales et al. | July 10, 1928 |
| 1,900,231 | Ede | Mar. 7, 1933 |
| 2,660,805 | Rothstein | Dec. 1, 1953 |